US005493302A

United States Patent [19]
Woll et al.

[11] Patent Number: 5,493,302
[45] Date of Patent: Feb. 20, 1996

[54] AUTONOMOUS CRUISE CONTROL

[76] Inventors: Jerry Woll, 16571 Corte Paulina, Poway, Calif. 92064; John Olds, 4550 Glacier Ave., Apt. 4, San Diego, Calif. 92120

[21] Appl. No.: 130,585

[22] Filed: Oct. 1, 1993

[51] Int. Cl.$^6$ .................................................. G01S 13/60
[52] U.S. Cl. .............................................. 342/71; 342/109
[58] Field of Search ................................ 342/70, 71, 109

[56] References Cited

U.S. PATENT DOCUMENTS 4,519,469  5/1985  Hayashi et al. .......................... 342/70
5,189,426  2/1993  Asbury et al. ........................... 342/70

Primary Examiner—Daniel T. Pihulic
Attorney, Agent, or Firm—Baker, Maxham, Jester & Meador

[57] ABSTRACT

A cruise control system for a vehicle includes a vehicle borne radar for determining range and closing rate of the vehicle relative to a target, such as another moving vehicle, ahead of the vehicle. The range and closing rate are used to determine a new set speed for the cruise control system which may be less than but is not greater than the speed entered in the cruise control by the driver of the vehicle. The new set speed is selected to prevent the vehicle from overtaking the target, and ideally reduces the closing rate to zero at a predetermined minimum distance from the target. In determining the new set speed, the system also determines incremental movements for the vehicle throttle using a selected gain boost and designed to minimize throttle jerk. If the target moves out of the path of the vehicle or speeds up, the system adjusts accordingly and eventually allows the vehicle to resume the originally entered speed when possible.

20 Claims, 9 Drawing Sheets

AUTONOMOUS CRUISE CONTROL

BACKGROUND OF THE INVENTION

1. Field of the Invention

The present invention relates to vehicle cruise control systems for allowing a driver of a vehicle to maintain a set speed without using the accelerator, and more particularly to a cruise control system which responds to a target ahead of the vehicle by reducing the speed entered into the cruise control system by the driver to prevent overtaking the target.

2. Description of Related Art

Cruise control systems for vehicles, such as automobiles, are well known. Such systems enable the driver of the vehicle to enter a desired speed into the system. Thereafter, the vehicle maintains the speed without the need for the driver to use the accelerator. The cruise control system maintains the speed by adjusting the throttle of the vehicle as necessary.

Cruise control systems are desirably and most safely used in conditions of light traffic. Accordingly, such systems are most effectively used in rural settings or other conditions characterized by light traffic, so that the system can be allowed to maintain speed for reasonable periods of time without interruption. Most cruise control systems allow the driver to disengage the system by turning off the control switch for the system or by pressing the brakes of the vehicle. Some more sophisticated cruise control systems allow the driver to reduce the speed of the vehicle from the entered speed by manipulating the controls for the system, and then resuming the entered speed by again manipulating such controls.

In driving conditions which involve heavier traffic, a driver often finds it necessary to frequently disengage or adjust the cruise control system, such as when overtaking another vehicle in the path of the driver's vehicle. This often results in the driver having to turn off the cruise control system and resume manual control of the vehicle's speed. Failure to turn off the cruise control system may pose safety problems, such as where the driver fails to disengage or adjust the cruise control system when rapidly approaching a much slower vehicle in the path of the driver's vehicle.

Accordingly, it would be desirable to provide a cruise control system capable of automatically responding to another vehicle or other target ahead of the vehicle by automatically reducing the vehicle speed by an appropriate amount, without the need for driver involvement. Such a system would also desirably be capable of determining when the vehicle is no longer closing on the target, such as when the target moves out of the path of the vehicle or speeds up, so that the vehicle speed can again be increased and the speed originally entered by the driver eventually resumed where possible. Such a cruise control system would enable the operator to safely use such system in conditions of moderate traffic as well as in conditions of light traffic.

SUMMARY OF THE INVENTION

Briefly stated, the present invention provides an autonomous cruise control system which is capable of automatic adjustment based on distance and closing rate to a target in the path of the vehicle. When no target is present, or when the target is moving at a speed which is greater than a desired speed entered by the operator the system maintains a desired constant speed. However, when the vehicle begins to close on a target, then the cruise control system compensates by automatically reducing the speed so that the vehicle remains a safe, predetermined minimum distance from the target. If the target then speeds up or moves out of the path of the vehicle, the cruise control system responds by increasing the speed, with the desired speed originally entered by the driver being restored when possible. In response to data indicating the presence of a target, the cruise control system determines incremental throttle movements for the vehicle so as to minimize throttle jerk.

In a preferred embodiment of an autonomous cruise control system in accordance with the present invention, a vehicle borne radar system of the type which may be used for collision avoidance is employed to provide range and closing rate information. Using the range, the system calculates an ideal closing rate in an attempt to reduce the closing rate to zero at the predetermined allowable minimum distance between the vehicle and the target. The actual closing rate is then subtracted from the ideal closing rate, to determine closing rate error. A new "set" speed for the cruise control system is then determined by calculating the speed of the target and adding the target speed to the ideal closing rate and the closing rate error.

Having determined a new set speed the system then determines speed error by subtracting the vehicle speed from the set speed, following which an ideal acceleration is calculated as a predetermined fraction or percentage of the speed error. Next, the acceleration error is determined by subtracting the actual acceleration from the ideal acceleration. A speed gain factor is calculated, based on vehicle speed, to minimize throttle jerk and a gain boost is calculated, based on the speed error. The system then calculates incremental throttle movements based on the acceleration error, the speed gain factor and the gain boost. The calculated incremental throttle movements are then used by the vehicle to adjust the vehicle speed to the new set speed in a rapid and efficient manner and with little or no throttle jerk.

Just as the cruise control system functions to reduce the set speed when it is determined that the vehicle is closing on the target, if the set speed is lower than the speed entered by the operator and the target is pulling away from the vehicle or the target has moved out of the path of the vehicle, the system functions in reverse fashion to resume the speed originally desired by the operator. In that instance, the system determines new set speeds which are higher, until the vehicle speed is increased to that originally entered by the driver, whenever possible.

The details of the preferred embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 1:
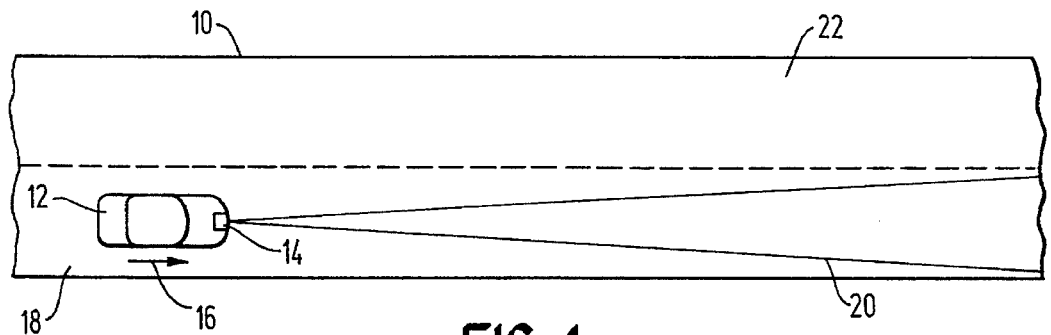
FIG. 1 is a plan view of a section of highway showing a vehicle equipped an autonomous cruise control system in accordance with the invention.

FIG. 1 shows a portion of a highway 10 which has a vehicle 12 thereon equipped with an autonomous cruise control system 14 according to the present invention. The vehicle 12 is assumed to be traveling in a direction shown by an arrow 16 within a lane 18 of the highway 10. The cruise control system 14 includes a radar system, as described hereafter in connection with FIG. 3, which has a beamwidth pattern 20 extending forwardly from the front end of the vehicle 12. As described hereafter, the radar system within the cruise control system 14 of the vehicle 12 provides range and closing rate information, enabling the cruise control system 14 to detect a target such as another vehicle ahead of the vehicle 12. The cruise control system 14 automatically selects new "set" speeds in order to maintain the vehicle 12 at a safe speed and a safe distance relative to the target.

FIG. 1 depicts a situation involving light traffic (i.e., there are no other vehicles ahead of the vehicle 12 and within the same lane 18 in which the vehicle 12 is traveling. Also, there are no vehicles close to the vehicle 12 in a second lane 22 of the highway 10). Accordingly, the light traffic conditions depicted in FIG. 1 are ideal from the standpoint of using a conventional cruise control system. In the case of the autonomous cruise control system 14 according to the invention, the driver of the vehicle 12 may turn on the cruise control system 14 and enter a desired speed therein by engaging an ENTER control on the system 14. As long as there are no other vehicles close to the vehicle 12, the cruise control system 14 will maintain the speed entered by the driver. The beamwidth pattern 18 of the radar system within the cruise control system 14 scans the highway 10 ahead of the vehicle 12. As long as there are no other vehicles ahead of the vehicle 12 that are too close and within the beamwidth 20, the cruise control system 14 functions to maintain the desired speed entered by the driver.

Figure 2:
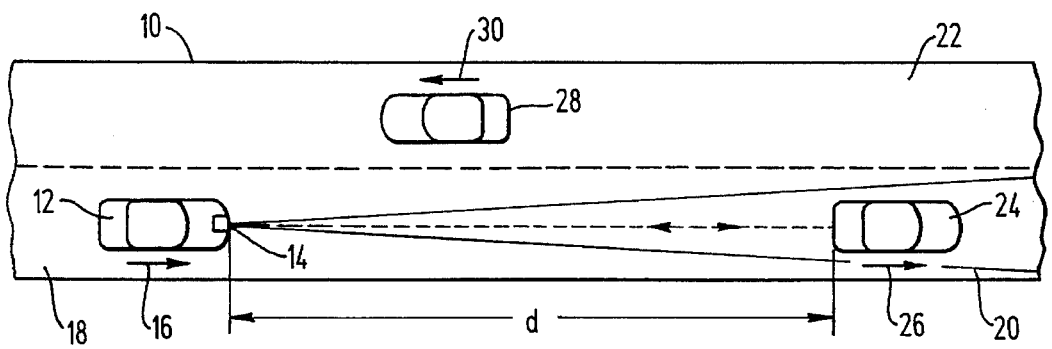
FIG. 2 is a plan view similar to that of FIG. 1, illustrating the manner in which the autonomous cruise control system tracks another vehicle as a target.

FIG. 2 depicts a portion of the highway 10 in which traffic conditions are heavier than those depicted in FIG. 1. In the case of FIG. 2, a second vehicle 24 is traveling ahead of the vehicle 12 within the lane 18, and in the same direction as the vehicle 12 as represented by an arrow 26. A third vehicle 28 is traveling in the lane 22 and in an opposite direction, as represented by an arrow 30.

The third vehicle 28 within the lane 22, of FIG. 2, is outside the beamwidth pattern 20 of the radar system of the cruise control system 14. Accordingly, such radar system does not detect the third vehicle 28 as a target. However, the third vehicle 28 need not be detected by the radar system, inasmuch as it is traveling within the adjacent lane 22 and therefore poses no immediate danger of collision with the vehicle 12. At the same time, the second vehicle 24 is traveling within the same lane 18 as the vehicle 12, so as to lie within the beamwidth pattern 20. Therefore, the second vehicle 24 poses a potential danger to the vehicle 12. Because the second vehicle 24 is within the beamwidth pattern 20, the radar system of the cruise control system 14 transmits a radar signal which strikes the second vehicle 24 and is reflected back to the radar system within the cruise control system 14. The beamwidth pattern of the present invention may be controlled by use of systems such as are disclosed in application for U.S. patent application Ser. No. 08/101,945, Monopulse Azimuth Radar System for Automotive Vehicles, assigned to the assignee of the present invention.

The radar system within the cruise control system 14 computes the range of the second vehicle 24, represented by a distance "d" in FIG. 2, in any conventional fashion. As the range d changes, the radar system within the cruise control system 14 continues to detect such changing range values, so that the range information is continuously updated. At the same time, the radar system within the cruise control system 14 provides a continuously updated determination of the closing rate of the vehicle 12 on the second vehicle 24. The closing rate may increase, such as when the vehicle 12 is traveling at a greater speed than the second vehicle 24 and is therefore overtaking the vehicle 24. Conversely, the closing rate may decrease, such as when the second vehicle 24 begins traveling at a greater speed than the vehicle 12 so as to pull away from the vehicle 12. If the second vehicle 24 is traveling at the same speed as the vehicle 12, then the closing rate is zero and the range d remains constant.

In accordance with the invention, and as described hereafter, the autonomous cruise control system 14 mounted within the vehicle 12 uses the range and closing rate information continuously provided by the radar system to automatically adjust the speed of the vehicle 12 without the need for any involvement of the driver of the vehicle 12, so as to maintain a safe speed and distance relative to the target represented by the second vehicle 24. When the cruise control system 14 has been turned on and a desired speed has been entered by the driver, as previously described in connection with FIG. 1, the cruise control system 14 adjusts the set speed as appropriate while tracking the second vehicle 24. If the vehicle 12 is closing on the vehicle 24, the cruise control system 14 responds by selecting new set speeds which will cause the vehicle 12 to decelerate to a speed essentially equal to that of the vehicle 24 when the range d has decreased to a minimum acceptable value. In one embodiment of the present invention, active braking may be initiated by the cruise control system 14 to decelerate the vehicle at an acceptable rate. If the second vehicle 24 then increases its speed so as to begin to pull away from the vehicle 12, the cruise control system 14 responds by increasing the set speed so as to accelerate the vehicle 12 to a higher speed, while at the same time maintaining a safe range d between the vehicles 12 and 24. When possible, the speed of the vehicle 12 is increased to that originally entered by the driver. In no event, however, can the cruise control system 14 set a higher speed than that entered by the driver of the vehicle 12. The cruise control system 14 also responds to the disappearance of the target by accelerating the vehicle 12 to the speed originally entered by the driver. This may occur, for example, where the second vehicle 24 turns off the highway 10, or changes lanes, so as to leave the beamwidth pattern 20 of the radar system.

If the driver of the vehicle 12 presses the brakes or turns off the control switch of the cruise control system 14, the cruise control system 14 is disengaged, leaving the driver in complete manual control of the speed of the vehicle 12. Also, in one embodiment of the present invention, the operator may manually accelerate the vehicle by activating the accelerator pedal without disengaging the system.

Figure 3:
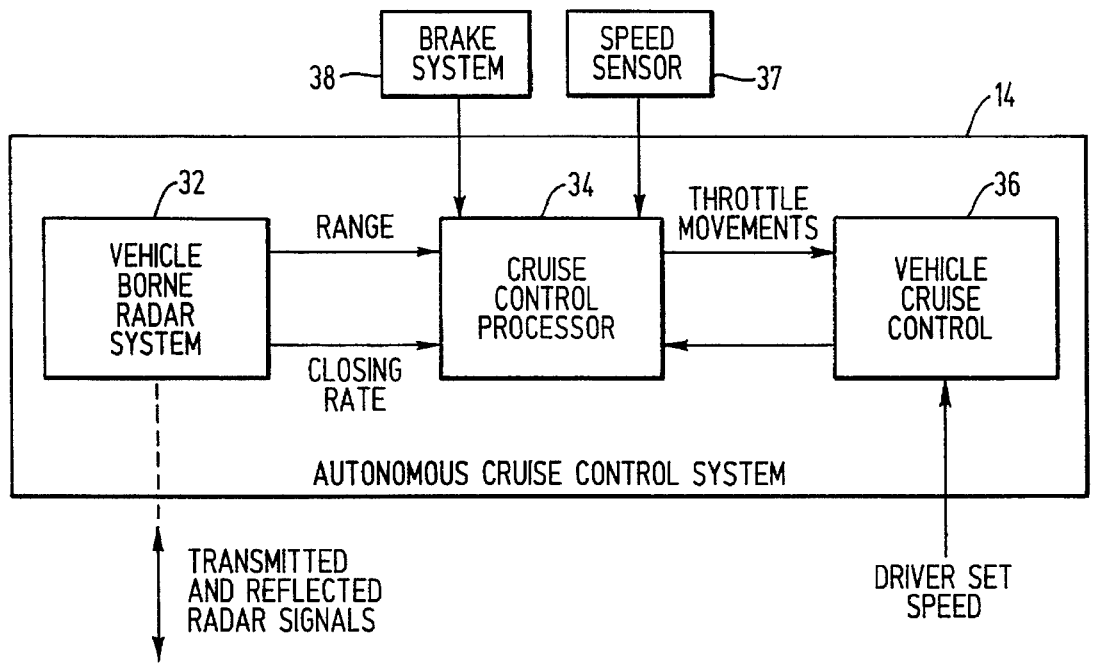
FIG. 3 is a block diagram of the autonomous cruise control system of the vehicle of FIGS. 1 and 2.

FIG. 3 is a block diagram of the autonomous cruise control system 14 within the vehicle 12. The cruise control system 14 includes a vehicle borne radar system 32, a cruise control processor 34 (which in one embodiment and may be shared with the radar system 32), and a vehicle cruise control 36. The vehicle cruise control 36 may be of conventional design and is operative to control the throttle of the vehicle 12 so as to maintain a desired speed entered by the driver of the vehicle 12, in conventional fashion. The vehicle borne radar system 32 may be of the type used in connection with collision avoidance systems. The vehicle borne radar system 32 provides range and closing rate information to the cruise control processor 34.

The vehicle borne radar system 32 may, for example, comprise one of the radar systems described in U.S. Pat. No. 3,952,303 of Watanabe et al, or copending application Ser. No. 08/020,600, now U.S. Pat. No. 5,285,207, entitled Multi-Frequency Automotive Radar System, assigned to the assignee of the present invention. The preferred embodiment of the present invention includes a radar system comprising a digital signal processor, such as described in copending U.S. patent application Ser. No. 07/930,066, now U.S. Pat. No. 5,302,956 entitled Multi-Frequency, Multi-Target Vehicular Radar System Using Digital Signal Processing, assigned to the assignee of the present invention and herein incorporated by reference. While the cruise control system 14 is described herein in connection with the vehicle borne radar system 32, it should be understood that the cruise control system 14 can be used with any device capable of providing range and closing rate information.

In one embodiment of the present invention, approximately every 32 msec a digital signal processor (DSP) passes to a target tracking algorithm, in known fashion, all the targets (with range and closing rate for each) that the DSP has detected which have a reflected power level that is above a predetermined magnitude. The tracking algorithm associates an identification number with each new target and monitors the behavior of existing targets. If the range of an existing target changes by the amount predicted by the closing rate associated with that target (within a predefined range), then a "hit" count for that target is incremented. A target is not considered valid until the hit count exceeds 3. If the hit count for a particular target is not incremented for a predetermined amount of time (such as 10 consecutive cycles of 32 msec each), then the target is no longer considered valid, and is dropped from the target tracking algorithm.

The distances to each target passed by the DSP to the target tracking algorithm are preferably compared, and the range and closing rate for the closest target are stored in a range variable and closing rate variable, respectively. If no valid targets exist, then the range variable is set to 350 ft. A cruise control routine then checks the value of the range for the closest target, and if it is greater than 300 ft., no targets are considered to be valid.

The preferred embodiment of the present invention includes an interference avoidance system, such as described in copending U.S. patent application Ser. No. 07/930,760, now U.S. Pat. No. 5,302,956, entitled Interference Avoidance System for Vehicular Radar System, which has been assigned to the assignee of the present invention, and which is herein incorporated by reference. The interference avoidance system detects when the noise floor of the received signals is above a predetermined level, preferably in two different frequency ranges. By comparing signal power in the noise floor of each frequency range to the predetermined levels (which may be entered by the operator, determined by monitoring the history of the received signal to determine norms levels of noise in the environment, or predetermined fixed values) the system determines that interference is present and causes the transmitter to change frequency by a predetermined amount. If interference is again encountered, the system repeats the process.

In accordance with the present invention, the cruise control processor 34 interrupts the normal operation of the vehicle cruise control 36 to override the driver entered speed and select a lower speed when the range and closing rate from the radar system 32 indicate that the vehicle 12 is closing on a target such as the second vehicle 24 shown in FIG. 2. The cruise control processor 32 responds to the range and closing rate information from the radar system 32 to control both the distance between the vehicle 12 and the target and the speed of the vehicle 12. The cruise control processor 34 also receives inputs from speed sensors 37 (such as a conventional speedometer), brake systems 38, and cruise controls (i.e., cruise on/off, cruise set, cruise resume) within the vehicle cruise control 36. Distance control is accomplished by carrying out a routine depicted by the block diagram of FIGS. 4A and 4B. Speed control is accomplished by carrying out the routine depicted in the block diagram of FIG. 5.

Figure 4A:
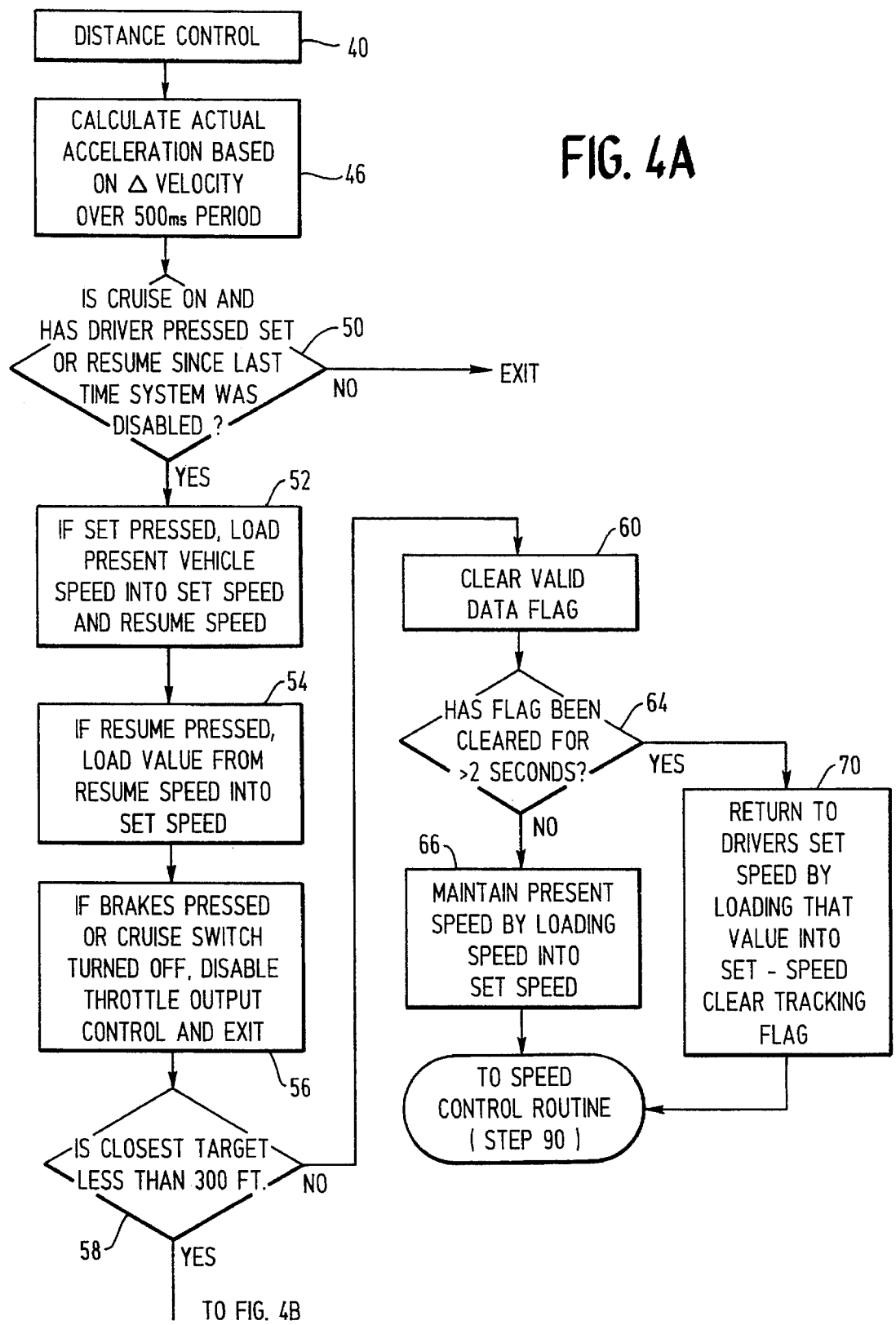
FIGS. 4A and 4B, taken together, comprise a flowchart of the steps executed by the autonomous cruise control system of FIG. 3 in performing distance control.
Figure 4B:
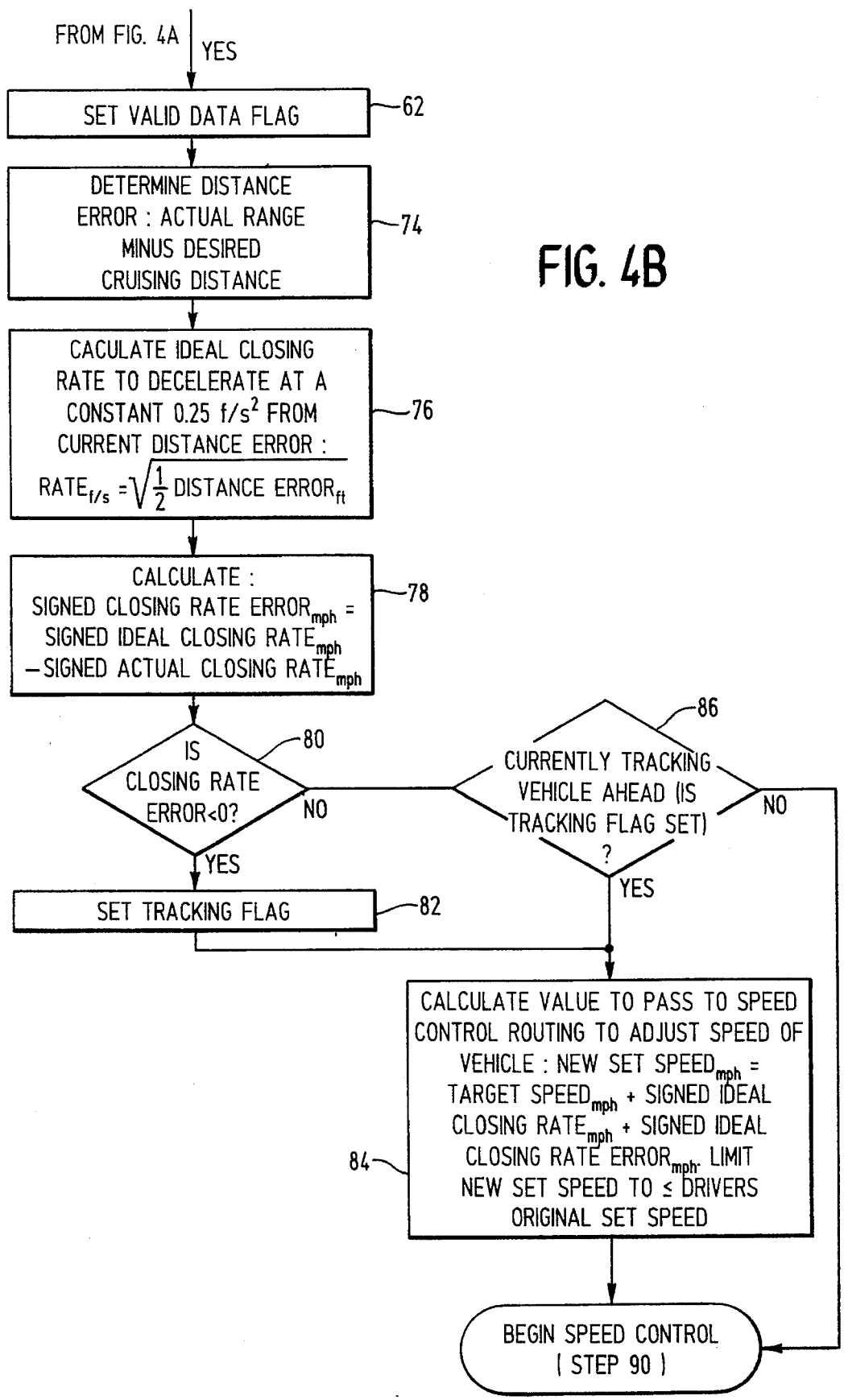

Referring to FIGS. 4A and 4B, the distance control routine 40 is preferably called on predetermined time intervals by an executive routine that manages other activities unrelated to the cruise control system, such as collision avoidance. The distance control routine uses the range and closing rate information of the closest target, which in the preferred embodiment are stored in the range and closing rate variables by the target tracking algorithm. In the preferred embodiment of the present invention, the data collection process includes receiving the reflections of transmitted signals, generating Doppler signals by hetrodyning the received signal with the transmitted signal, digitizing the Doppler signal, mapping the digitized Doppler signal from the time domain to the frequency domain by means of a digital signal processor, such as a DSP56001 digital signal processor manufactured by Motorola, and determining the phase difference between the transmitted signal and the received signal, as described in copending U.S. patent application Ser. No. 07/930,066. By digitizing the Doppler signal and mapping the signal into the frequency domain, the range and relative speed of a target can be determined. Furthermore, a determination as to whether there is interference can be made, as described in copending U.S. patent application Ser. No. 07/930,760, U.S. Pat. No. 5,302,956.

The system of FIGS. 4A and 4B operates over a succession of periods, each preferably approximately 500 ms in duration. At the end of each period, the system calculates the actual acceleration of the vehicle 12 based on the change in velocity (Δ velocity) over the last period (STEP 46). Following that, a determination is made as to whether the vehicle cruise control 36 is on and whether the driver of the vehicle 12 has engaged the ENTER control since the last time the cruise control system 14 was disabled (STEP 50). If the answer is no, then the process is terminated. If the answer is yes, then the present vehicle speed value, as determined by a common mechanical speedometer, electro-mechanical speedometer, radar-based speedometer, or any other means for measuring the speed of the vehicle, is loaded into SET SPEED and DESIRED SPEED variables or registers within a memory within the cruise control processor 34 (STEP 52). If a RESUME control of the vehicle cruise control 36 has been pressed, then the value of the DESIRED SPEED variable is loaded into the SET SPEED variable (STEP 54). If the brakes of the vehicle 12 are pressed, or if a CONTROL switch of the vehicle cruise control 36 is turned off, then control of the vehicle throttle by the cruise control system 14 ceases and the process is terminated (STEP 56).

Next, the system determines whether or not valid data has been collected (STEP 58). In the preferred embodiment of the present invention, valid data is considered to have been collected when the hit count exceeds 3, and the hit count has been incremented within a predetermined amount of time (such as within the last 10 consecutive cycles, as defined above). If the closing rate reduces to zero (i.e., the target begins moving at the same speed as the vehicle 12), then valid data will not be collected. If valid data has not been collected, then a VALID DATA flag is cleared (STEP 60). If valid data has been collected, as determined in STEP 58, then the system proceeds to set the VALID DATA flag (STEP 62 in FIG. 4B). A determination is made as to whether the flag has been clear for more than a predetermined amount of time, preferably about 2 seconds (STEP 64). If not, then the present speed of the vehicle 12 is maintained by loading the present speed into the SET SPEED variable (STEP 66). The system then enters the speed control routine of FIG. 5. If a determination is made that the flag has been clear for more than the predetermined amount of time (STEP 64), then the system returns to the driver-entered speed by loading the value of the DESIRED SPEED variable into the set speed variable, and clearing a TRACKING flag (STEP 70). Thereafter, the system enters the speed control routine shown in FIG. 5.

Thus, data is acquired, and all calculations and throttle moves are done at the end of each period. If data collected at the end of a period is not valid, then the target is considered temporarily lost and the system maintains the current speed of the vehicle 12 (based on the assumption that the temporary loss of target is due to speed matching of the target). If this temporary loss continues for at least 2 seconds, then the target is considered completely lost and the system returns to the speed originally entered by the driver, as described above.

Referring to FIG. 4B, the system determines a distance error, which is the actual range of the target d minus a desired cruising distance (STEP 74). In the present example, a minimum safe distance of 75 feet between the vehicle 12 and the target is preferably chosen to represent a cruising distance. The difference between this desired cruising distance and the actual range d represents the distance error.

The system calculates the ideal closing rate in order to decelerate at a constant $0.25 f/s^2$ from the current distance error (STEP 76). The ideal closing rate is "signed" (as are other calculated values described hereafter) in that each such value may be positive or negative. Closing rates are positive, while opening rates are negative. To calculate the ideal closing rate, the system preferably uses the equation:

$$signed\ ideal\ closing\ rate_{fls} = (\tfrac{1}{2}\ distance\ error_{ft})^{1/2}$$

Figure 6:
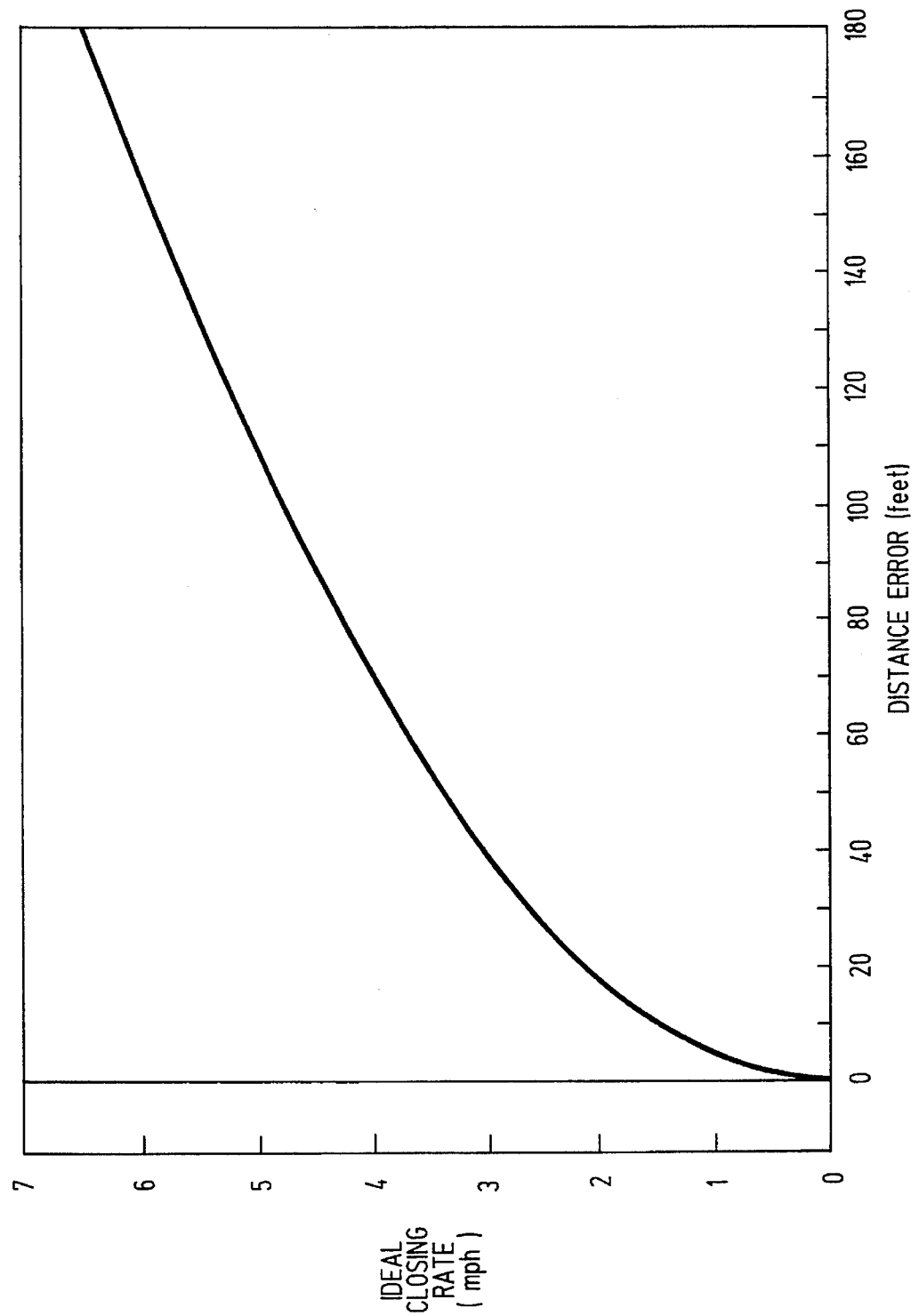
FIG. 6 is a diagrammatic plot of ideal closing rate as a function of distance error, which is useful in explaining the operation of the autonomous cruise control system of FIG. 3.

FIG. 6 is a diagrammatic plot of a preferred ideal closing rate, in miles pier hour (mph), as a function of distance error, in feet. A distance error of zero preferably corresponds to a range of 75 feet, as previously noted. At the other end of the scale of FIG. 6, a distance error of 180 feet corresponds to a range of 255 feet (i.e., 180+75). It will be seen from FIG. 6 that the ideal closing rate increases from 0 mph at 0 distance error to a value of approximately 6.5 mph at a distance error of 180 feet. The calculated ideal closing rate is designed to slow the vehicle 12 at a constant at 0.25 f/s/s rate (0.17 mph/s$^2$ or 0.008 g), so that a 0 closing rate is reached at the same time that 0 distance error (75 feet) is reached. For simplicity of illustration, FIG. 6 is only illustrated in the context of a single quadrant in which both the ideal closing rate and the distance error have positive values. In actuality, however, the mirror image third quadrant also exists in which both the ideal closing rate and the distance error have negative values. Again, a negative closing rate is actually an opening rate.

Referring again to FIG. 4B, the signed closing rate error is calculated (STEP 78). This calculation is made using the following equation:

$$signed\ closing\ rate\ error_{mph} = signed\ ideal\ closing\ rate_{mph} - signed\ actual\ closing\ rate_{mph}$$

If the closing rate error is less than 0, as determined in STEP 80, then the TRACKING flag is set (STEP 82). Conversely, if the closing rate error is not less than 0, then a determination is made as to whether the system is currently tracking the target vehicle ahead by checking whether the TRACKING flag is set (STEP 86). If the TRACKING flag is not set, then the system begins performing the speed control process of FIG. 5. If the TRACKING flag is set, then a value is calculated and passed to the speed control routine of FIG. 5 to adjust the speed of the vehicle 12 (STEP 84). This calculation is performed in accordance with the equation:

$$new\ set\ speed_{mph} = target\ speed_{mph} + signed\ ideal\ closing\ rate_{mph} + signed\ closing\ rate\ error_{mph}$$

The new set speed is limited to no more than the speed originally entered by the driver, so that the vehicle never exceeds the speed originally entered.

Thus, the distance control routine of FIGS. 4A and 4B goes through the various steps shown and described above to calculate a new set speed for the vehicle 12 in response to the range and closing rate information, in this fashion, if valid data is present for more than the predetermined duration (10% of the 500 ms perice in the preferred embodiment). As previously noted, if the data is not valid for more than predetermined duration, then the target is considered temporarily lost and the system maintains the current speed of the vehicle 12 on the assumption that the temporary loss of target is due to speed matching of the target vehicle. If the temporary loss continues for at least some predetermined period of time (such as 2 seconds in the preferred embodiment), then the target is considered to be completely lost and the system returns to the speed originally entered by the driver.

Figure 5:
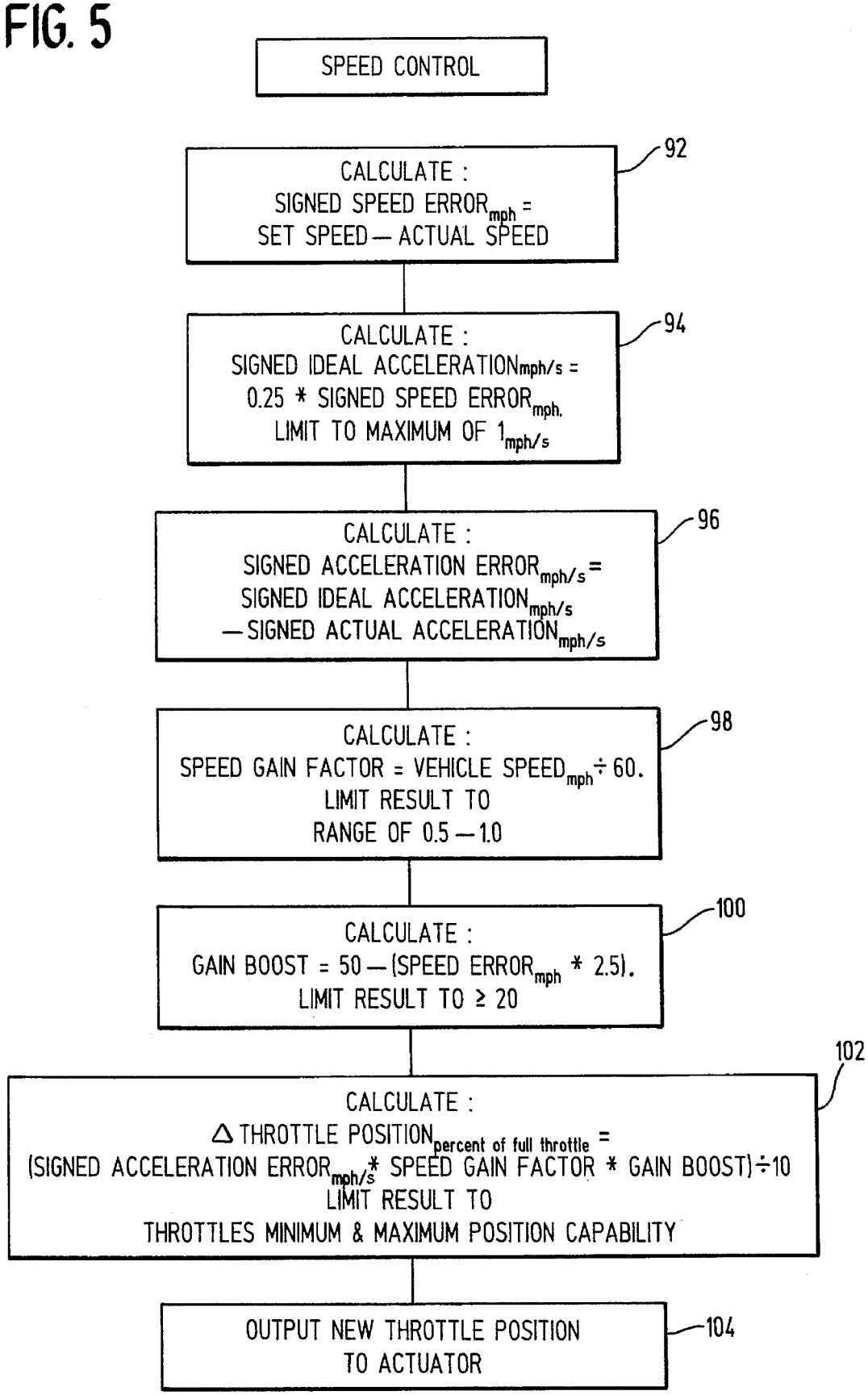
FIG. 5 is a flowchart of the steps executed by the autonomous cruise control system of FIG. 3 in performing speed control.

The speed control routine is shown in FIG. 5. After the driver sets the desired speed in the vehicle cruise control 36, the system calculates the signed speed error (STEP 92). This is calculated in accordance with the equation:

$$signed\ speed\ error_{mph} = set\ speed - actual\ vehicle\ speed$$

Having determined the signed speed error, a signed ideal acceleration is determined (STEP 94). This is calculated in accordance with the equation:

$$signed\ ideal\ acceleration_{mph/s} = 0.25 * signed\ speed\ error_{mph}$$

The signed ideal acceleration is preferably limited to a maximum of about 1 mph/s.

Figure 7:
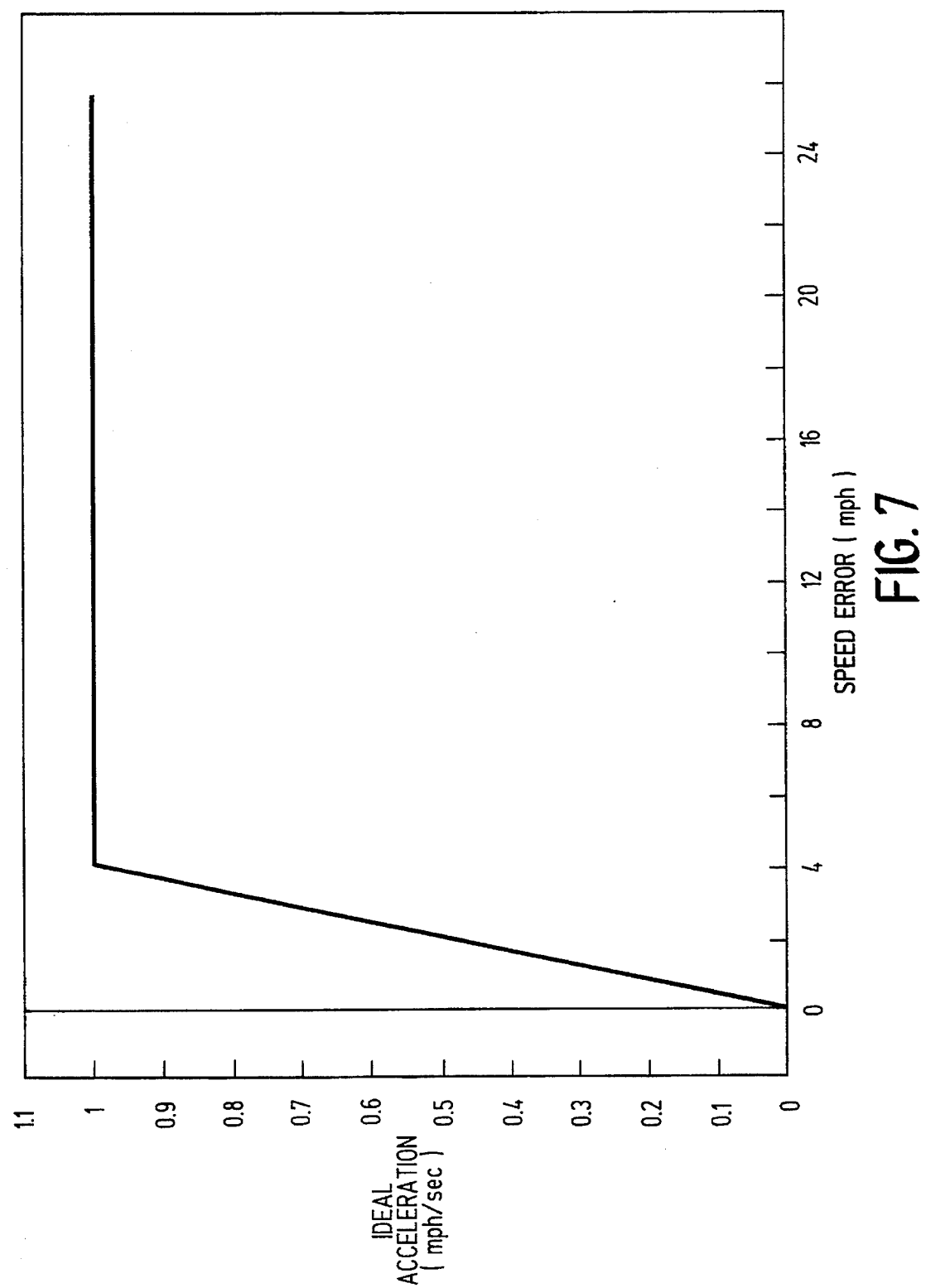
FIG. 7 is a diagrammatic plot of ideal acceleration as a function of speed error, which is useful in explaining the operation of the autonomous cruise control system of FIG. 3.

FIG. 7 is a plot of the ideal acceleration in miles-per-hour per second (mph/s) as a function of speed error in miles-per-hour (mph). As shown in FIG. 7, the ideal acceleration preferably increases from 0 at a speed error of 0 to the maximum allowable value of about 1 mph/s at a speed error of approximately 4 mph. For greater values of speed error, the ideal acceleration remains at the maximum allowable value of about 1 mph/s.

Figure 8:
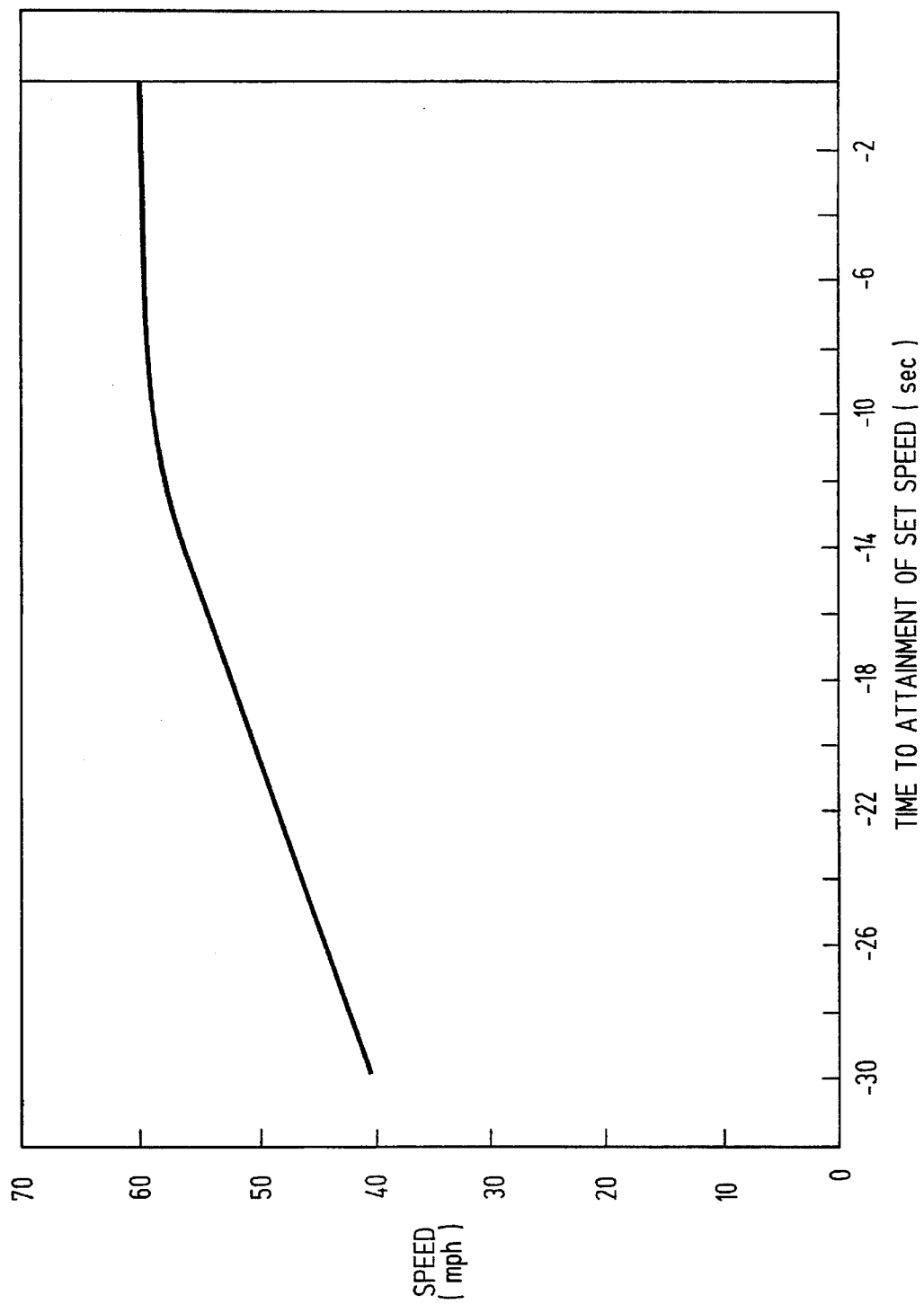
FIG. 8 is a diagrammatic plot of set speed as a function of time to attainment of the set speed, which is useful in explaining the operation of the autonomous cruise control system of FIG. 3.

FIG. 8 is a plot of speed of the vehicle 12 in miles-per-hour as a function of the time required to attain a set speed, in seconds. As described above in connection with FIGS. 4A and 4B, the system is capable of calculating a new set speed for the vehicle. FIG. 8 shows an ideal approach to achieve a set speed of 60 mph when the actual vehicle speed is less than 60 mph. For example, and as seen in FIG. 8, if the actual vehicle speed is 40 mph, then it takes approximately 30 seconds to reach a new set speed of 60 mph. If the actual vehicle speed is 50 mph, the system requires just over 20 seconds to reach a new set speed of 60 mph.

Figure 9:
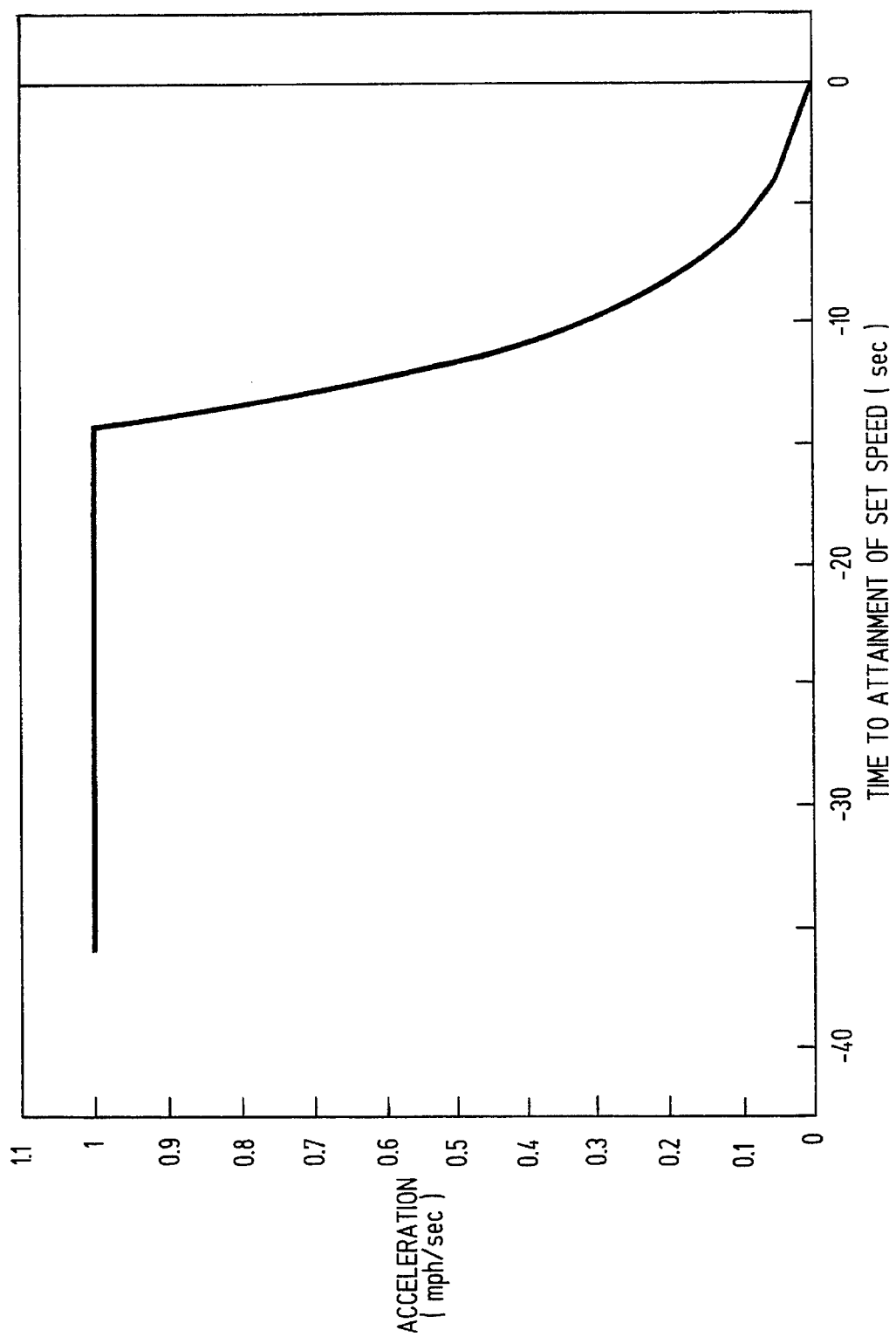
FIG. 9 is a diagrammatic plot of acceleration as a function of time to attainment of set speed, which is useful in explaining the operation of the autonomous cruise control system of FIG. 3.

FIG. 9 is a plot of acceleration of the vehicle 12 in miles-per-hour per second (mph/s) as a function of time to reach a new set speed, in seconds. Again, vehicle acceleration is preferably limited to approximately 1 mph/s. Under the ideal condition depicted in FIG. 9, the acceleration is maintained at about 1 mph/s as the time to reach the set speed decreases from more than 40 seconds to approximately 14 seconds. At the point in time at which it requires approximately 14 seconds to reach set speed, the acceleration is decreased until it eventually reaches 0 as the new set speed is attained.

Referring again to FIG. 5, and having determined an ideal acceleration (STEP 94), the system next determines a signed acceleration error (STEP 96). This calculation is made using the equation:

$$signed\ acceleration\ error_{mph/s} = signed\ ideal\ acceleration_{mph/s} - signed\ actual\ acceleration_{mph/s}$$

Next, a speed gain factor is calculated to minimize throttle jerk of the vehicle 12 at less-than-expressway speeds (STEP 98). This is calculated in accordance with the equation:

$$speed\ gain\ factor = vehicle\ speed_{mph} \div 60$$

In any event, the speed gain factor is preferably limited to the range of about 0.5–1.0.

Figure 10:
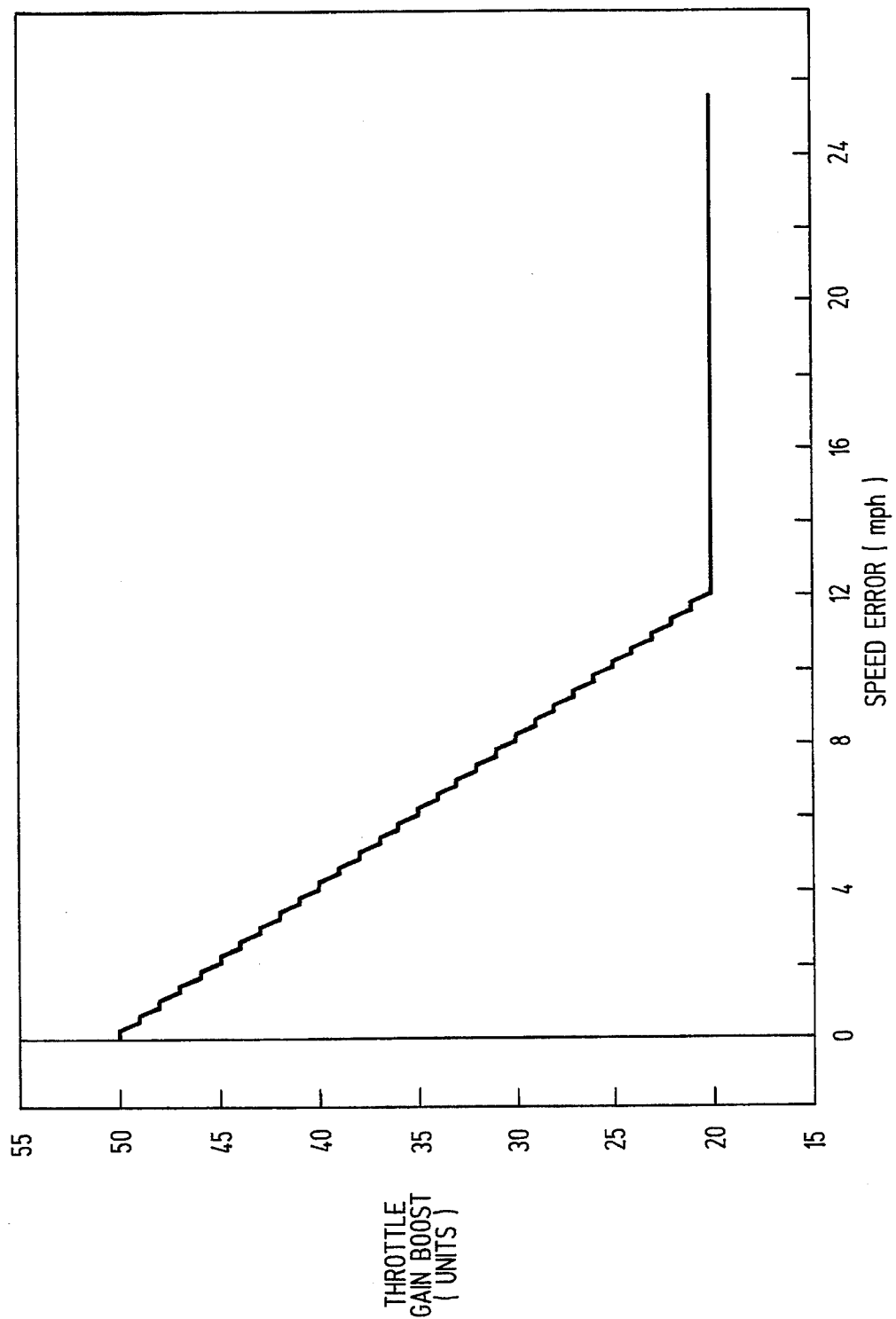
FIG. 10 is a diagrammatic plot of throttle gain boost as a function of speed error, which is useful in explaining the operation of the autonomous cruise control system of FIG. 3.

A boost in movement of the vehicle throttle is needed when approaching the new set speed to keep the system from going into low frequency oscillation. Therefore, a gain boost is preferably calculated in accordance with the equation:

$$gain\ boost = 50 - (speed\ error_{mph} * 2.5)$$

with a preferred minimum value of about 20 (STEP 100). This is shown in FIG. 10, which is a plot of throttle gain boost, as a function of speed error in miles-per-hour (mph). Throttle boost is shown as a unitless measure. The throttle gain boost decreases from 50 at 0 speed error to the 20 minimum at a speed error of 12 mph in the preferred embodiment. For speed errors above 12 mph, the throttle gain boost remains at the minimum (i.e., 20 in the preferred embodiment).

Referring again to FIG. 5, a final calculation is performed to determine incremental throttle movement (STEP 102). The system calculates the change in throttle position as a percentage of full throttle using the equation:

$$\Delta throttle\ position_{percent\ of\ full\ throttle} = (signed\ acceleration\ error_{mph/s} * speed\ gain\ factor * gain\ boost) \div 10$$

The result of this calculation is limited to the throttle's minimum and maximum position capability. The change in throttle position is then output to an actuator for the vehicle throttle system (STEP 104).

While a number of embodiments of the present invention have been described, it will be understood that various modifications may be made without departing from the spirit and scope of the invention. For example, the transceiver may transmit and receive ultrasonic radiation. Also, the RF transmit frequency may be a multiple frequency signal having a multitude of frequencies, each frequency being time division multiplexed with the others. Furthermore, the RF transmit frequency may be a continuous wave signal. Additionally, the RF transmit signal may be a pseudo-pulse signal in which the Gunn diode 9 is not turned completely off, but rather alternates between two discrete power levels. Still further, a wide variety of mechanisms or methods can be used for warning the vehicle operator of the presence of an obstacle, such as bells, physical vibrations, visual indications placed on the dashboard or windshield, and/or use of a mirror incorporating a material (e.g., lead lanthanum zirconate titanate, or PLZT) which changes color (i.e., turns red) or otherwise changes optical properties when the cruise control system detects an obstacle in the path of the vehicle. Still further, the values disclosed above may be varied as desired, and are not limited to the particular values disclosed.

Accordingly, it is to be understood that the invention is not to be limited by the specific illustrated embodiment, but only by the scope of the appended claims.

We claim:

1. A cruise control system for a vehicle including:

a) cruise control means, coupled to a vehicle for controlling the speed of the vehicle at a desired speed selected by a driver of the vehicle;

b) means for determining an error distance;

c) means for validating a target by comparing the distance between the target and the vehicle and determining that the target is within a predicted range based upon a previous detection of the target, and only validating the target upon three consecutive determinations that the target is within the predicted range; and d) means responsive to the square root of the error distance for automatically adjusting the speed at which the cruise control system is set to prevent overtaking the target.

2. The cruise control system of claim 1, wherein the means responsive to the square root of the error distance is capable of both increasing and decreasing the speed of the vehicle.

3. The cruise control system of claim 2, wherein the means responsive to the square root of the error distance cannot adjust the speed at which the cruise control system is set to a speed greater than the desired speed selected by the driver.

4. The cruise control system of claim 1, wherein the means responsive to the square root of the error distance comprises a radar system mounted on the vehicle.

5. The cruise control system of claim 1, wherein the means responsive to the square root of the error distance is also responsive to the closing rate of the vehicle relative to the target.

6. The cruise control system of claim 5, wherein the means responsive to the square root of the error distance determines a new speed at which the cruise control is set, based on the error distance and the closing rate, and determines incremental movements of a throttle for the vehicle, based on the new speed.

7. The cruise control system of claim 5, wherein the means responsive to the square root of the error distance does not adjust the speed at which the cruise control system is set when the closing rate is determined to be zero.

8. A cruise control system for a vehicle including:
 a) means for setting the cruise control system at a desired speed for the vehicle selected by a driver of the vehicle;
 b) means responsive to a target ahead of the vehicle for continuously determining distance of the target from the vehicle and closing rate of the vehicle on the target;
 c) means for validating a target by comparing the distance between the target and the vehicle and determining that the target is within a predicted range based upon a previous detection of the target, and only validating the target upon three consecutive determinations that the target is within the predicted range; and
 d) means responsive to the distance and the closing rate for tracking the target and reducing the speed at which the cruise control system is set when the vehicle is closing on a valid target.

9. The cruise control system of claim 8, wherein the means responsive to a target comprises a radar system mounted on the vehicle.

10. The cruise control system of claim 8, wherein the means responsive to the distance and the closing rate is capable of increasing the speed at which the cruise control system is set up to a maximum equal to the desired speed for the vehicle selected by the driver when it is determined that the target is moving away from the vehicle.

11. The cruise control system of claim 8, wherein the means responsive to the distance and the closing speed comprises means for calculating an ideal closing rate at which the closing speed becomes zero at the minimum distance between the vehicle and the target, means for calculating a closing rate error using the ideal closing rate and the closing rate determined by the means responsive to a target, and means for calculating a new set speed for the cruise control based on the ideal closing rate and the closing rate error and by determining speed of the target.

12. The cruise control system of claim 11, wherein the means responsive to the closing rate and a closing speed further comprises means for calculating speed error based on the new set speed and by determining speed of the vehicle, means for calculating ideal acceleration as a function of the speed error, means for calculating acceleration error based on the ideal acceleration and by determining actual acceleration of the vehicle, and means for controlling the cruise control based on the vehicle speed, the speed error and the acceleration error.

13. The cruise control system of claim 12, wherein the means for controlling the cruise control comprises means for calculating a speed gain factor based on the vehicle speed, means for calculating a gain boost based on the speed error, and means for calculating an incremental throttle movement for the vehicle based on the acceleration error, the speed gain factor and the gain boost.

14. The cruise control system of claim 11, wherein the means for calculating a closing rate error comprises means for subtracting the closing rate determined by the means responsive to a target from the ideal closing rate to determine the closing rate error, and the means for calculating a new set speed comprises means for adding the ideal closing rate, the closing rate error and the speed of the target to determine the new set speed.

15. The cruise control system of claim 12, wherein the means for calculating speed error comprises means for subtracting the vehicle speed from the set speed to determine the speed error, and the means for calculating acceleration error comprises means for subtracting the actual acceleration of the vehicle from the ideal acceleration.

16. A cruise control system for a vehicle including:
 a) cruise control circuit, coupled to a vehicle for controlling the speed of the vehicle at a desired speed selected by a driver of the vehicle, and responsive to a target ahead of the vehicle for automatically adjusting the speed at which the cruise control system is set to prevent overtaking the target; and
 b) means for validating two or more targets by comparing the distance between each target and the vehicle and determining that each target is within a predicted range based upon a previous detection of each target, and only validating a target upon three consecutive determinations that the target is within the predicted range.

17. A method of changing a set speed in a cruise control for a vehicle to avios a target ahead of the vehicle, comprising the steps of:
 a) determining range of the target from the vehicle;
 b) validating a target by comparing the distance between the target and the vehicle and determining that the target is within a predicted range based upon a previous detection of the target, and only validating the target upon three consecutive determinations that the target is within the predicted range;
 c) determining an actual closing rate of the vehicle on the target; and
 d) determining, based on the range and the actual closing rate, a set speed for the cruise control that will maintain a selected minimum distance between the vehicle and the target.

18. The method of claim 17, wherein the step of determining a set speed comprises the steps of:
 a) determining an ideal closing rate at which the actual closing rate is reduced to zero at the selected minimum distance of the vehicle from the target;
 b) subtracting the actual closing rate from the ideal closing rate to determine closing rate error;
 c) determining speed of the target; and
 d) adding the speed of the target to the ideal closing rate to determine a new set speed for the cruise control.

19. The method of claim 18, comprising the further steps of:
 a) determining actual speed of the vehicle;
 b) subtracting actual speed of the vehicle from the set speed to determine speed error;
 c) calculating the ideal acceleration as a selected fraction of the speed error;
 d) determining actual acceleration of the vehicle;

e) subtracting actual acceleration of the vehicle from the ideal acceleration to determine acceleration error; and f) controlling a throttle of the vehicle based on actual speed of the vehicle, the speed error and the acceleration error.

20. The method of claim 19, wherein the step of controlling a throttle comprises the steps of:

a) calculating a speed gain factor based on actual speed of the vehicle, to minimize throttle jerk;

b) calculating a gain boost based on the speed error; and c) calculating an incremental throttle movement based on the acceleration error, the speed gain factor and the gain boost.

* * * * *